US005410425A

United States Patent [19]
Rhodes

[11] Patent Number: 5,410,425
[45] Date of Patent: Apr. 25, 1995

[54] MAGNETRON CATHODES IN PLASMA ELECTRODE POCKELS CELLS

[75] Inventor: Mark A. Rhodes, Pleasanton, Calif.

[73] Assignee: The United States of America as represented by the United States Department of Energy, Washington, D.C.

[21] Appl. No.: 58,844

[22] Filed: May 10, 1993

[51] Int. Cl.⁶ .............................................. G02F 1/03
[52] U.S. Cl. .................................... 359/254; 359/257
[58] Field of Search ............... 359/252, 253, 254, 257, 359/258, 321, 322; 204/298.19, 192.12; 313/231.31

[56] References Cited

U.S. PATENT DOCUMENTS

| | | | |
|---|---|---|---|
| 3,639,771 | 2/1972 | Borrelli | 359/252 |
| 4,013,532 | 3/1977 | Cormia | 204/298.19 |
| 4,615,588 | 10/1986 | Goldhar et al. | 359/254 |
| 5,021,139 | 6/1991 | Hartig | 204/298.19 |
| 5,045,166 | 9/1991 | Bobbio | 204/192.12 |

Primary Examiner—Do Hyun Yoo
Assistant Examiner—A. Zarabian
Attorney, Agent, or Firm—Henry P. Sartorio; Miguel A. Valdes; William R. Moser

[57] ABSTRACT

Magnetron cathodes, which produce high current discharges, form greatly improved plasma electrodes on each side of an electro-optic crystal. The plasma electrode has a low pressure gas region on both sides of the crystal. When the gas is ionized, e.g., by a glow discharge in the low pressure gas, the plasma formed is a good conductor. The gas electrode acts as a highly uniform conducting electrode. Since the plasma is transparent to a high energy laser beam passing through the crystal, the plasma is transparent. A crystal exposed from two sides to such a plasma can be charged up uniformly to any desired voltage. A typical configuration utilizes helium at 50 millitorr operating. pressure and 2 kA discharge current. The magnetron cathode produces a more uniform plasma and allows a reduced operating pressure which leads to lower plasma resistivity and a more uniform charge on the crystal.

17 Claims, 3 Drawing Sheets

MAGNETRON CATHODES IN PLASMA ELECTRODE POCKELS CELLS

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates generally to optical switches and transparent electrodes for an optical switch, and more particularly, to the use of magnetron cathodes for high current pulsed plasma discharges in large aperture plasma electrode Pockels cells.

2. Description of Related Art

System architectures for very large inertial confinement fusion (ICF) lasers require active optical elements with apertures on the order of one meter. Large aperture optical switches are needed for isolation of stages, switch-out from regenerative amplifier cavities and protection from target retro-reflections. In operation, it is necessary to apply a voltage uniformly to the crystal faces. No conventional optical switch technology is scalable to such large apertures. Pockels cells conventionally utilize coaxial ring electrodes but Pockels cells with ring electrodes require crystal thickness comparable to the aperture. Thin crystal Pockels cell designs using transparent conducting metallic films or liquid layers have also been proposed, but have unacceptable resistivity at large apertures or are not appropriate for use with high intensity laser beams. Other potential approaches include fast Faraday rotators or transient volumetric thermal gratings.

A thin crystal can be used to construct a longitudinal Pockels cell if one has transparent electrodes which apply a uniform electric field along the crystal optical axis coincident with the propagation direction of the laser beam. Thin crystals are also required for efficient second harmonic generation with ICF lasers, and a longitudinal configuration with transparent electrodes can be utilized for an electro-optically tuned second harmonic switch. See U.S. Pat. No. 4,615,588 which states that the plasma can be created either by a main high voltage pulser used to charge up the crystal or by auxiliary discharges or external sources of ionization, however, the only voltage pulsers discussed are a thyratron with a pulse charged cable and a self triggered, low inductance spark-gap. See U.S. Pat. No. 5,045,166 for a method and apparatus for producing a high density ionic gas discharge in a magnetron.

SUMMARY OF THE INVENTION

It is an object of the present invention to provide a method for using magnetron cathodes for high current pulsed plasma discharges in large aperture plasma electrode Pockels cells.

It is also an object of the present invention to provide a high current magnetron cathode for plasma electrode Pockels Cells.

Magnetron cathodes, which produce high current discharges, form greatly improved plasma electrodes on each side of an electro-optic crystal. The plasma electrode comprises a low pressure gas region on both sides of the crystal. When the gas is ionized, e.g., by a glow discharge in the low pressure gas, the plasma formed is a good conductor. The gas electrode acts as a highly uniform conducting electrode. Since the plasma is transparent to a high energy laser beam passing through the crystal, the plasma is transparent. A crystal exposed from two sides to such a plasma can be charged up uniformly to any desired voltage. A typical configuration utilizes helium at 50 millitorr operating pressure and 2 kA discharge current. The magnetron cathode produces a more uniform plasma and allows a reduced operating pressure which leads to lower plasma resistivity and a more uniform charge on the crystal.

A primary characteristic of a magnetron cathode is that a magnetic field is developed either by permanent or electromagnets near the surface of the cathode material. The exact shape of this field is arbitrary except that it must allow for a closed ExB orbit, where E refers to the electric field vector developed by the voltage that maintains the discharge and B is the appropriate component of the magnetic field. The magnetic field helps confine the ionized gas particles leading to a higher density of both ions and electrons near the cathode surface. The ions tend to be accelerated by the discharge voltage towards the cathode surface. When the ions bombard the cathode surface, they produce secondary electrons which are emitted from the cathode and accelerated back into the plasma where they undergo ionizing collisions with the background gas, thus maintaining the discharge.

DETAILED DESCRIPTION OF THE INVENTION

Figure 1:
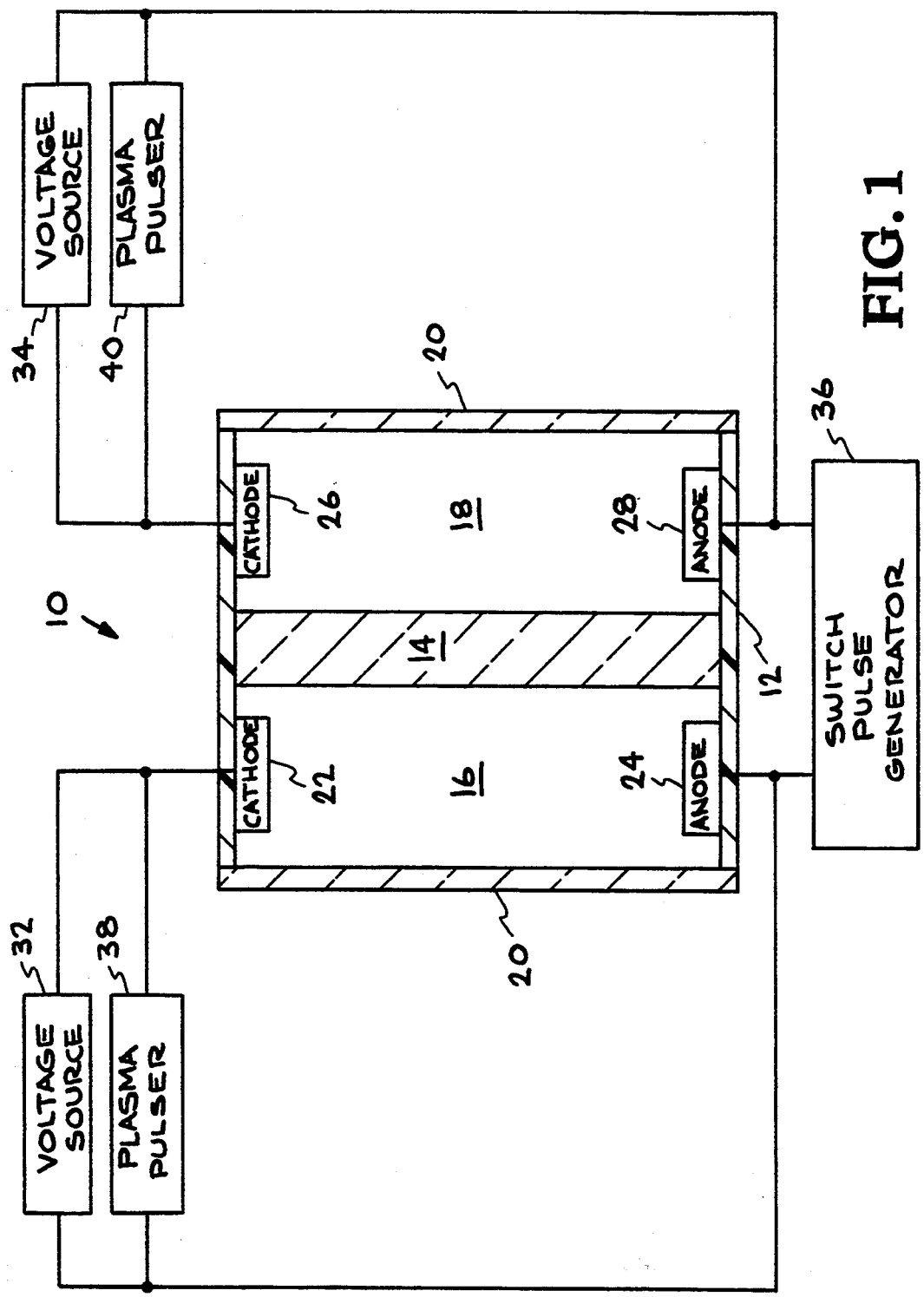
FIG. 1 shows a preferred embodiment of a magnetron cathode Pockels cell.

A preferred embodiment for Pockels cells with magnetron cathodes is illustrated in FIG. 1. The region between the anode and cathode electrodes is evacuated by a turbo-molecular vacuum pump. The pump is sized so that with no fill gas introduced into the Pockels cell, the pressure in the cell is less than $5 \times 10^{-5}$ torr. A constant flow of working gas (helium with 1% oxygen) is introduced into the cell so that the pressure in the cell is increased to 20–50 millitorr. The exact pressure is optimized for a particular cathode geometry and magnetic field strength. Helium is the preferred ion species for normal operation. Helium is non-reactive, has a relatively low sputtering coefficient, and has high ion mobility leading to good diffusion of plasma. The purpose of the oxygen is to react with carbon atoms sputtered from the cathode surface, producing CO and $CO_2$ which are pumped away rather than deposited on the interior crystal and window surface. Before a switch pulse is applied to charge the crystal and initiate optical switching action, the current in the plasma discharge must be pulsed to more than 2000 amperes. This pulsed current is driven by capacitor discharge. To guarantee that the current pulses on each side of the cell are well synchronized, the gas in the cell is pre-ionized by operating a low current (40 mA) discharge. Typically, this low current discharge is gated so that it is on for only 100 ms before the high current pulse generator is triggered. This is done to minimize cathode heating which leads to increased switch losses from thermally induced strain in the crystal.

For application in plasma electrode Pockels cells, cathode structures must be capable of sustaining pulsed currents in the range 2000–5000 amperes. Typical duration of this pulsed current is 10–20 microseconds. Another constraint on cathode design is cathode temperature. Heat radiated from the cathode can cause thermal gradients in the nearby electro-optic crystal which leads to strain induced birefringence losses. Ideally, magnetron cathodes would operate at room temperature.

Referring to FIG. 1, a pair of electrodes comprising an anode and a cathode on each side of the crystal is used to establish the initial sheets of glow discharge in low pressure gas covering the entire optical aperture. Since the current flows parallel to the crystal, no electric field is applied along the optical axis and the pre-ionization current does not affect the polarization of the transmitted optical beam. One pair of electrodes can then be used at a later time, once the desired plasma conditions are established, to charge up the crystal to the required voltage. This design allows one to establish the initial plasma conditions independently of the voltage pulse requirements for electro-optic switching. Pockels cell 10 comprises a hollow cell body 12, e.g., made of polyethylene, and a KDP or KD*P (90% deuterated KDP) crystal 14 mounted within the cell body 12 which divides the interior of cell body 12 into two separate chambers 16 and 18. Optical windows 20, e.g., fused silica, are mounted over openings in opposite ends of the cell body 12 at ends of the chambers 16 and 18 and are aligned with the crystal 14 so that a laser beam may pass through the windows 20 and through the chambers 16, 18 and the crystal 14. The laser beam is generally incident normal to crystal 14.

One magnetron cathode 22, across from anode 24, is mounted in chamber 16, close to the surface of crystal 14 and near opposed edges of crystal 14. A second magnetron cathode 26, across from anode 28, is similarly mounted in chamber 18. The two magnetron cathodes 22, 26 near one edge of crystal 14 are connected to a pre-ionization voltage source 32, and 34 respectively. The two anodes 24, 28 extend through body 12 and are connected to a switch pulse generator 36. In operation, a pre-ionization voltage pulse from source 32 is applied across cathode 22 and anode 24 and across cathode 26 and anode 28, to produce a conducting plasma adjacent to the faces of crystal 14 in chamber 16 and 18. Before a switch pulse is applied to charge the crystal and initiate optical switching action, the current in the plasma discharge must be pulsed to more than 2000 amperes from plasma pulser 38, 40, connected to cathode 22, 26, respectively. After the plasma has been produced, a high voltage pulse from source 36 is applied to anodes 24, 28. Because of the conductivity of the plasma region adjacent to the crystal, the voltage applied across anodes 24, 28 will be applied to the crystal 14, providing uniform charging of the crystal surfaces.

The two magnetron cathode geometry is one embodiment for creating the plasma electrodes and for applying the switching voltage. Magnetrons on each side of the crystal 14 are used to establish a plasma in both chambers 16, 18, with minimum voltage applied across the crystal. Following pre-ionization, the main switching pulse is applied to anodes 24, 28 on the opposing sides of the crystal. For more uniform pre-ionization with a large crystal, anodes 22, 26 on each side of the crystal may be segmented and the electrode segments individually ballasted. The voltage pulse then charges-up the crystal faces using the plasma as conducting electrodes.

Unlike the metallic film or liquid conductors, a plasma is a very nonlinear medium and there are regimes of operation which are highly undesirable. For example, with insufficient pre-ionization, a large jitter in switching time is observed, and copious amounts of radio frequency radiation are generated by the cell. At moderate pre-ionization levels, plasma resistance is a function of switching voltage and very slow optical rise times are observed for low voltages. However, proper choice of operating parameters with this geometry allows one to obtain rise times in the nanosecond regime and with no observable jitter.

Figure 2A:
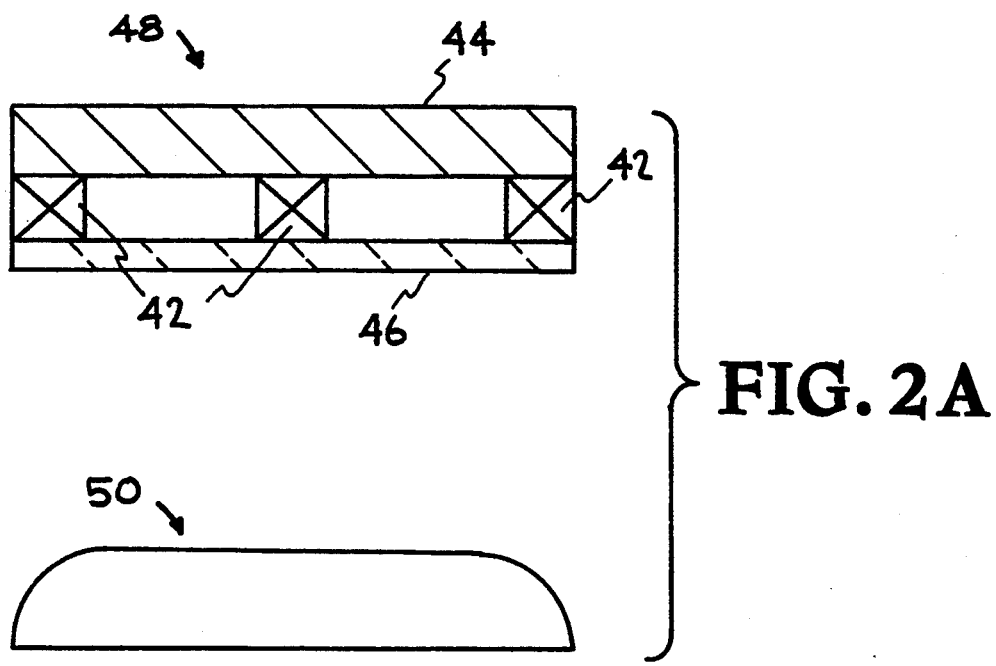
FIG. 2a illustrates the planar magnetron cathode design.
Figure 2B:
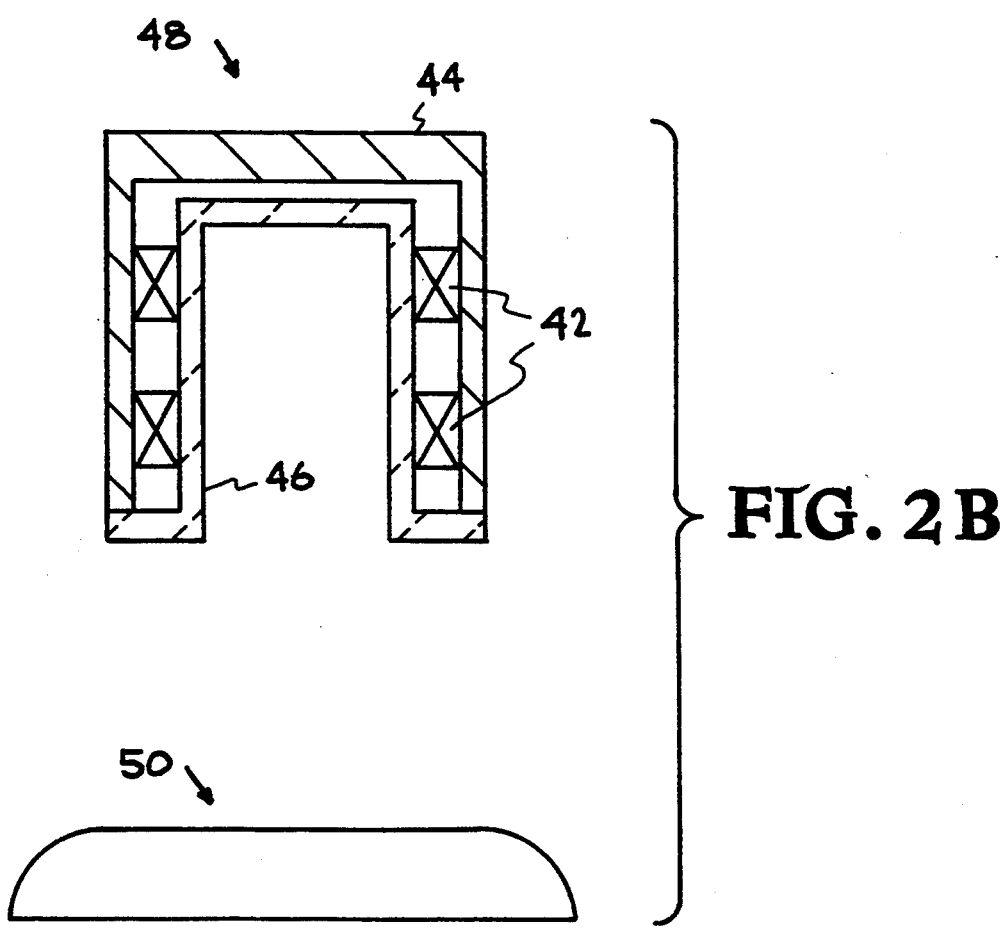
FIG. 2b illustrates the hollow magnetron cathode design.
Figure 3:
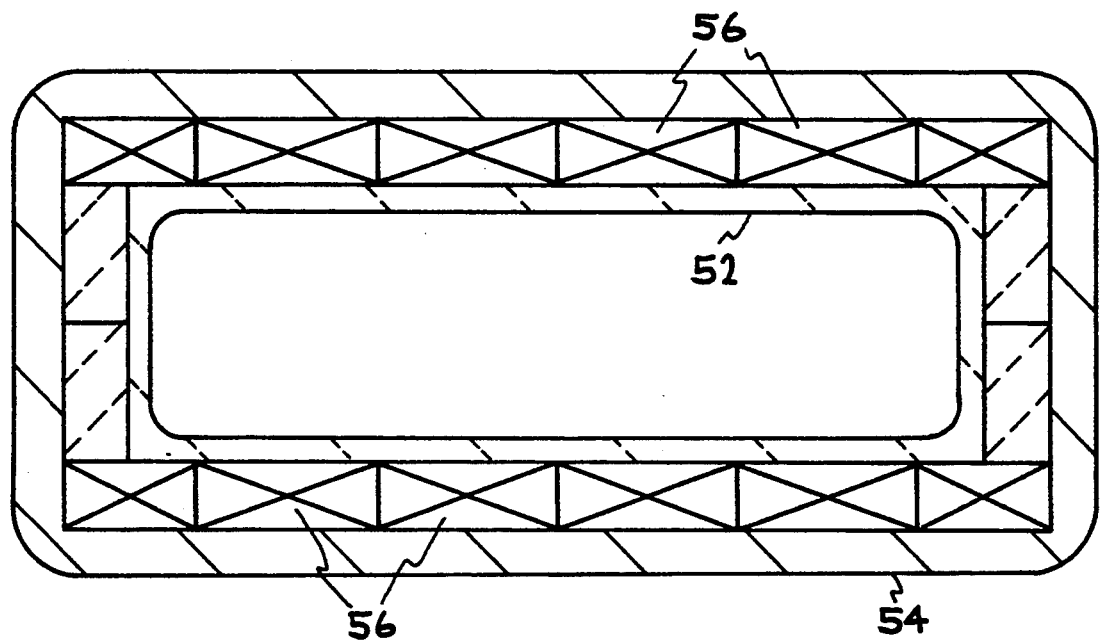
FIG. 3 shows a hollow magnetron front view.
Figure 4:
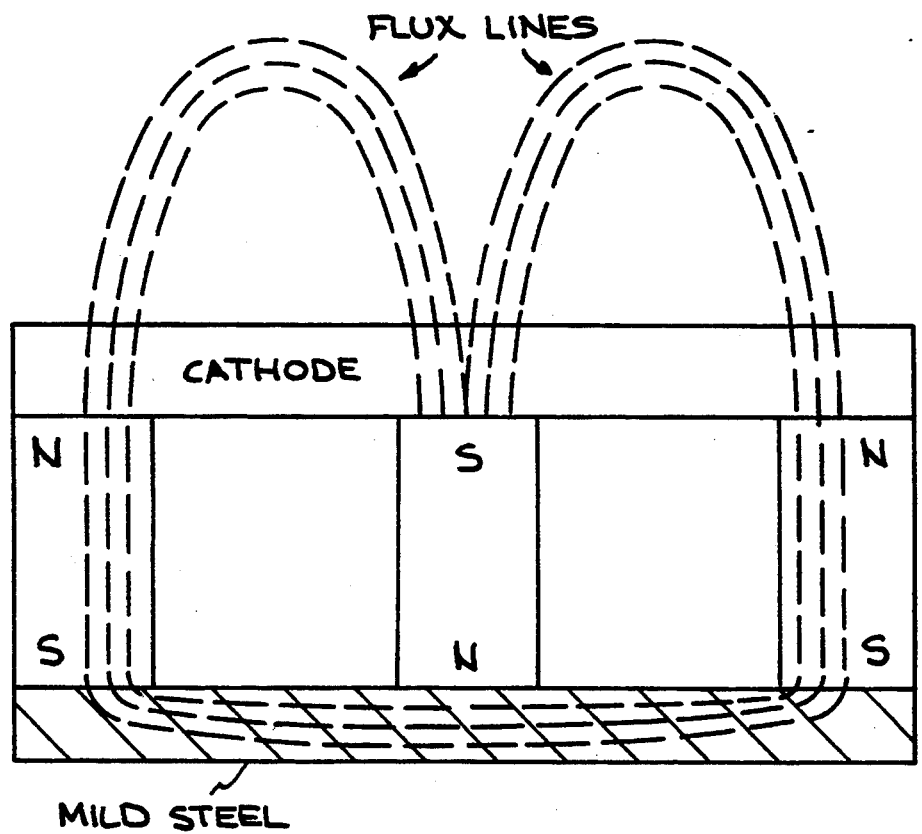
FIG. 4 depicts flux lines for a planar magnetron cathode.

Good results are obtainable with the planar and hollow magnetron geometries, shown in FIG. 2a and 2b. Both designs are operable at high-current (up to 5000 amperes) and have obtained uniform plasma discharges leading to excellent optical switching (>99%) over a 32×32 cm aperture. FIG. 2a shows the planar design, which is simpler and more compact but exposes the electro-optic crystal to a higher heat load. The hollow magnetron design, shown in FIG. 2b, takes up more room but is very effective in shielding the crystal from heat dissipated at the cathode. Magnets 42 are located between mild steel casing 44 and graphite surface 46, for cathode 48, which is located across from anode 50. In both cases, cathode heating is limited by minimizing duration of the low current (40 mA) simmer discharge that precedes the high-current pulse. The simmer duration is set for about 100 ms. FIG. 3 shows a hollow magnetron front view with an inner shell 52 of graphite, and outer shell 54, of mild steel. Permanent magnets 56 are located around the perimeter of inner shell 52. FIG. 4 depicts the flux lines between magnets in a planar cathode design.

A primary characteristic of a magnetron cathode is that a magnetic field is developed either by permanent or electromagnets near the surface of the cathode material. The exact shape of this field is arbitrary except that it must allow for a closed ExB orbit, where E refers to the electric field vector developed by the voltage that maintains the discharge and B is the appropriate component of the magnetic field. The magnetic field helps confine the ionized gas particles leading to a higher density of both ions and electrons near the cathode surface. The ions tend to be accelerated by the discharge voltage towards the cathode surface. When the ions bombard the cathode surface, they produce secondary electrons which are emitted from the cathode and accelerated back into the plasma where they undergo ionizing collisions with the background gas, thus maintaining the discharge. For low current discharge, an equilibrium plasma density profile forms where plasma loss is balanced by ionization. When the current is pulsed to over 2000 amperes in about 6 microseconds, a large flux of ions to the cathode is required to provide sufficient electrons. In addition, the plasma sheath width near the cathode is modified so that electrons are accelerated to high enough energy to create a cascade or avalanche of electrons, thereby providing sufficient charge carriers to maintain the discharge. If the current builds up faster than the plasma can supply electrons, then an arc forms at the cathode surface. Cathode surface arcs propagate only as far as the high density ExB plasma region at the cathode surface and not all the way to the anode. Typically, discharges with cathode sparks still produce sufficiently uniform plasmas for optical switching efficiencies >99%.

Changes and modifications in the specifically described embodiments can be carried out without departing from the scope of the invention which is intended to be limited only by the scope of the appended claims.

I claim:

1. An electro-optic switch, comprising:
   a hollow body;
   an electro-optic crystal mounted in the body and dividing the body into two chambers;
   a pair of transparent windows mounted to the body and aligned with the crystal to allow a light beam to be transmitted through the body and the crystal;
   a plurality of electrodes extending through the body into the two chambers;
   a low pressure gas filling the two chambers;
   an anode and magnetron cathode connected to said electrodes in each chamber;
   pre-ionization means to produce a conducting region in each chamber between said anode and magnetron cathode;
   current pulsing means connected to said anode and magnetron cathode to ionize said gas and produce a sheet of conducting plasma adjacent said crystal;
   high voltage means connected to said electrodes to apply a high voltage to the crystal through said conducting plasma.

2. The switch of claim 1, wherein the gas is within a pressure range of 20 to 50 millitorr.

3. The switch of claim 2, wherein the gas is a mixture of helium and 1% oxygen.

4. The switch of claim 1, wherein the crystal is a KDP or KD*P (90% deuterated KDP) crystal.

5. The switch of claim 4, further including a fused silica plate mounted to one face of the crystal.

6. The switch of claim 1, wherein said magnetron cathodes comprise a planar design.

7. The switch of claim 1, wherein said magnetron cathodes comprise a hollow design.

8. The switch of claim 2, wherein said gas is selected from a group consisting of argon, helium, neon or mixtures thereof.

9. A method of switching an optical beam by means of an electro-optic crystal, comprising:
   evacuating a region of a cell between an anode and a magnetron cathode;
   flowing a gas mixture of helium and 1% oxygen at 20 to 50 millitorr through said cell;
   pre-ionizing said gas in said cell by operating a low current discharge;
   pulsing said gas with a high current discharge producing a sheet of optically transparent conducting plasma adjacent a face of said crystal;
   applying a voltage to said plasma to apply an electric field to said crystal;
   directing said optical beam through said plasma to said crystal.

10. The method of claim 9, wherein said evacuating step is carried out by pumping gas out of said cell with a tubo-molecular pump to below $5 \times 10^{-5}$ torr.

11. The method of claim 9, wherein said flowing step is carried out by pumping a mixture of helium and 1% oxygen at 20 to 50 millitorr through said cell.

12. The method of claim 9, further including the step of optimizing gas flow pressure for cathode geometry.

13. The method of claim 9, further including the step of optimizing gas flow pressure for magnetic field strength.

14. The method of claim 9, wherein the step of pre-ionizing is carried out by operating a current discharge of 40 milliamperes through the cell.

15. The method of claim 9, further including the step of pre-ionizing the gas for a period of 100 milliseconds before pulsing said gas with a high current discharge.

16. The method of claim 9, wherein the pulsing step is carried out for 10 to 20 microseconds.

17. The method of claim 9, wherein the pulsing step is carried out by capacitor discharge at 2000 to 5000 amperes.

* * * * *